United States Patent [19]

Hise

[11] 4,228,112
[45] Oct. 14, 1980

[54] ULTRA-THIN ROTATING DISK GAS DIFFUSER (AND BUBBLE SHEARING METHOD EMPLOYING THE SAME)

[75] Inventor: Ralph E. Hise, Littleton, Colo.

[73] Assignee: FMC Corporation, Chicago, Ill.

[21] Appl. No.: 909,566

[22] Filed: May 25, 1978

Related U.S. Application Data

[63] Continuation of Ser. No. 801,569, May 31, 1977, abandoned, which is a continuation of Ser. No. 618,257, Sep. 30, 1975, abandoned.

[51] Int. Cl.$^2$ ................................................. C02C 5/04
[52] U.S. Cl. ........................................ 261/87; 261/93; 261/DIG. 71; 210/221 R; 210/221 P; 209/170
[58] Field of Search .................. 261/87, DIG. 71, 93; 209/169, 170; 210/15, 63 R, 220, 221 R, 219, 221 P; 416/181, 231, 233

[56] References Cited

U.S. PATENT DOCUMENTS

| | | | |
|---|---|---|---|
| 3,650,513 | 3/1972 | Werner | 261/87 |
| 3,917,763 | 11/1975 | Schafer | 261/87 |
| 3,927,152 | 12/1975 | Kyrias | 261/122 |
| 3,992,491 | 11/1976 | Ihrig et al. | 261/87 |

OTHER PUBLICATIONS

*AIAP Journal*, vol. 9, No. 2, Feb. 1971, "Turbulent Boundary Layer on a Rotating Disk", by Paul Cooper, pp. 255–261.

*Elements of Physics*, by Smith, 1948, McGraw-Hill, pp. 149–150.

Primary Examiner—Frank W. Lutter
Assistant Examiner—Gregory N. Clements
Attorney, Agent, or Firm—Dressler, Goldsmith, Shore, Sutker & Milnamow, Ltd.

[57] ABSTRACT

A rotating gas diffuser for shearing fine gas bubbles from the surface thereof when the diffuser is immersed in a body of liquid and rotated therein. The rotatable shaft of the diffuser carries a disk like member defining at least one gas plenum having a porous wall out of which gas introduced into the plenum can pass to form nascent gas bubbles which are then sheared off by the viscous shear forces exerted by the liquid in which the disk is rotating. Preferably both the top wall and the bottom wall forming the gas plenum or plenums are porous. The ratio of the overall diameter of the disk to the maximum thickness of the disk in the gas diffusing area occupied by the plenums is at least about 32:1. Improved results are obtained when this ratio is at least about 48:1, more improvement is obtained with a ratio of at least about 64:1, and still greater improvement with a ratio of at least about 128:1. The preferred value of the ratio is at least about 256:1.

16 Claims, 4 Drawing Figures

ULTRA-THIN ROTATING DISK GAS DIFFUSER (AND BUBBLE SHEARING METHOD EMPLOYING THE SAME)

This is a continuation of application Ser. No. 801,569, filed May 31, 1977, which was a continuation of application Ser. No. 618,257, filed Sept. 30, 1975, both of which are now abandoned.

This invention relates to bubble shearing apparatus, and in particular to a rotating gas diffuser for shearing fine gas bubbles from the surface thereof when the diffuser is immersed in a body of liquid and rotated therein.

BACKGROUND OF THE INVENTION

Gas diffusers designed to produce fine gas bubbles in a body of liquid through the process of bubble shearing have been known for some time. U.S. Pat. No. 3,650,513 issued to Werner on March 21, 1972 provides one of the most recent examples of such bubble shearing apparatus, in the form of a rotating disk with porous surfaces on both the top and the bottom of the disk.

Three embodiments of a rotating gas diffuser are disclosed in side elevation or cross section in FIGS. 1, 2 and 8 of the Werner patent just referred to. The ratio of the disk diameter to maximum disk thickness in the gas diffusing area in these embodiments is approximately 15:1, 13:1 and 16:1, respectively as taken from the drawings. It was evidently believed that these ratios of disk diameter to thickness were preferred ratios representing the best mode contemplated by the inventor for carrying out his invention, despite the fact that it has been known for a long time that extremely thin solid disks are preferred if it is desired to reduce the parasitic drag on such a disk due to the vertically oriented edge surface of the disk when it is rotated in a body of liquid in which it is immersed.

Apparently it was believed that replacing the vertically oriented edge surface of the rotating disk with a tapered annular portion, as shown in the Werner patent, would reduce the parasitic drag to which the disk is subjected enough to make it unnecessary to employ a thin disk to reduce that drag, and thus would avoid the structural problems of providing a disk of such dimensions. It may even have been believed that it was not possible to use a thin rotating disk in bubble shearing apparatus because it was assumed that a typical gas plenum—together with any porous plates thick enough to avoid cracking under the forces that would be exerted if it was decided to introduce gas into the plenum at relatively high pressure, as well as under the other stresses of ordinary use—would occupy so much space as to make it necessary to have a relatively thick rotating disk such as disclosed in the various figures of the prior art patent referred to. Or it may have been believed necessary to employ a deeper plenum than has now been found necessary, in order to assure the uniform distribution of gas pressure within the plenum, with a resulting uniform gas flow throughout the entire area of the porous diffusing surface.

This reluctance to use a thin rotating disk in bubble shearing apparatus might have been overcome if there had been any recognition in the prior art of the harmful effect on the ultimate size of the bubbles derived from the use of a rotating disk gas diffuser of the vortices that are shed at the edge of the rotating disk and embedded in the turbulent wake and jet flowing outward from the disk. But so far as the prior art shows, there was no recognition of this harmful effect until the instant invention was made.

The basic hydrodynamics of the formation of the wake and jet moving radially outward from the edge of a rotating disk has been well known for some time. This phenomenon results basically from the fact that when a disk is rotated in a liquid in which it is immersed, the drag of the rotating disk on the liquid adjacent the disk produces a boundary layer flow at the top and bottom surfaces of the rotating disk. The thickness of the boundary layer, that is, the thickness of the transition zone from the liquid moving at the speed of the disk to the main body of liquid that is virtually still, is generally quite thin in comparison to the diameter of the disk.

The boundary layer flow is not a purely tangentially directed flow, but contains a component directed radially outward that is created by the centrifugal force resulting from the rotation of the disk. As the upper and lower boundary layers spiral off the top and bottom surfaces of the rotating disk, they form a wake at the disk edge that in turn is transformed into a spiraling jet that moves radially away from the disk. The wake and the jet are generally turbulent flows, but they are not entirely free of structure in the vicinity of the disk. For one thing, the two boundary layers tend to be parallel flows separated by the thickness of the disk. For another, the liquid motion created between the two boundary layers triggers swirling motions that develop into large vortices attached to the edge of the disk.

Periodically these vortices are shed from the disk, and spiral outward with the boundary layer flow like miniature tornadoes. As a result, these "tornadoes" entrain large quantities of bulk liquid at the edges of the wake and the jet, until the vortices dissipate in the jet. The entrainment of previously quiescent liquid in the jets causes the jet flow to grow to ten or twenty times the magnitude of the boundary layer flows. This entrainment—produced as it is by vortices that are of relatively large size in comparison to the size of turbulent eddies—is frequently referred to as "large scale entrainment."

For representative discussions in the prior art illustrating the growing understanding over the years of the nature of the boundary layer on the surface of a rotating disk, see von Karman, T., "On Laminar and Turbulent Friction," Zeitschrift fur Angewandte Mathematik und Mechanik, 1 (1921) pp. 233-252 (Translation: NACA TM 1092 (1945), especially pages 20-30); Gregory, N., Stuart, J. T. and Walker, W. S., "On the Stability of Three-dimensional Boundary Layers with Application to the Flow Due to a Rotating Disk," Phil. Trans. A 248 (1955) pp. 155-199; Cham, T. S., and Head, M. R., "Turbulent Boundary Layer Flow on a Rotating Disk," Journal of Fluid Mechanics, 37 (1969)pp. 129-147; and Cooper, P., "Turbulent Boundary Layer on a Rotating Disk Calculated with an Effective Viscosity," AIAA Journal, 9 (1971) pp. 255-261.

For the growing understanding up to 1971 of the basic hydrodynamics of the development and breaking off of vortices from various solid bodies moving through a liquid, with some recognition of the resulting large scale entrainment of quiescent liquid, see Chanaud, R. C., "Measurements of Mean Flow Velocity Beyond a Rotating Disk," Journal of Basic Engineering, Transactions ASME, Series D, 93 (1971) pp. 199-204 and discussion by P. D. Richardson, p. 204; and Bevilaqua, P. M., and Lykoudis, P. S., "Mechanism of Entrainment in Turbulent Wakes," AIAA Journal, 9 (1971) pp. 1657–1659.

Knowledge of the general principles of hydrodynamics that begin to explain the development of the wake and jet at the edges of a rotating disk has not, however, led prior workers in the field to examine the various detailed factors relating to that phenomenon and to the effect of the wake and jet on the size of the bubbles that are dispersed outwardly from a rotating gas diffuser and then rise through the body of liquid. Among these factors are (1) the number of vortices produced by the rotation of the disk, (2) the size and spacing of the vortices, (3) the velocity of movement of the vortices radially outward with respect to the rotating disk, (4) the pressure differential between the interior and exterior of individual vortices, (5) the thickness of the resulting wake and jet, (6) the rate of decay of the vortices through viscous dissipation, (7) the transport of bubbles from the turbulent wake/jet into the interior of the vortices, (8) the coalescence of bubbles in the interior of the vortices, (9) the effect of the spacing between bubbles on the number of bubbles coalesced in the interior of the vortices, (10) the comparison of bubble coalescence in the small scale turbulent eddies present in the wake and jet with the coalescence taking place inside the vortices, (11) the comparison of the rate of bubble coalescence in the vortices created in the transition from laminar to turbulent flow on the surface of the rotating disk with the rate of bubble coalescence in the vortices shed from the edges of the disk, and (12) the comparison of the size of the bubbles sheared from the surface of the disk with the size of the bubbles rising from the turbulent wake or jet at the edge of the rotating disk.

If the effect of the disk thickness on these various detailed factors (whether taken separately, all together, or in any combination of the various factors) had been examined by prior art workers, this work might possibly have led to an understanding of the effect of the vortices shed from the edges of a rotating disk member upon the size of the bubbles produced by bubble shearing with a rotating gas diffuser, which might conceivably in turn have suggested the desirability of using a very thin disk like member in such a gas diffuser. But no such work was ever done, and the indicated impact of disk thickness on bubble size was apparently wholly unsuspected until the present invention was made.

As a matter of fact, certain work reflected in the papers referred to above actually led away from the present invention because those papers emphasized the presence of large scale entrainment of quiescent liquid caused specifically by vortices generated at the transition from laminar to turbulent boundary layer flow on the surface of the rotating disk, and this particular type of production of vortices is of course independent of the thickness of the disk. This emphasis may as a practical matter have led prior art workers away from consideration of the effect of disk thickness on the size of the bubbles resulting from the use of a rotating gas diffuser, insofar as that bubble size is affected by the shedding of vortices at the edges of the rotating disk, which is the central question to which the present invention is addressed.

SUMMARY OF THE INVENTION

To facilitate dissolution of gas bubbles in any liquid into which they are introduced, it is critical that the finest possible bubbles be produced in order to achieve the highest possible dissolution rate. This will in turn result in the smallest loss of undissolved gas at the surface of the body of liquid into which the bubbles are introduced, minimize the size of the bubble shearing equipment required, and minimize the amount of power required to operate that equipment. These goals are readily achieved by use of the apparatus of the present invention.

According to the present invention, it has been discovered that utilization of a gas diffuser having a rotating disk of very thin dimensions produces surprisingly improved results in terms of small bubble size. In other words, a high ratio of disk diameter to maximum disk thickness in the gas diffusing area produces the best possible bubble shearing results.

With a ratio of 13:1 to 16:1 such as disclosed in Werner U.S. Pat. No. 3,650,513, the bubble shearing results are inadequate because the gas flow at a given bubble size is too small for efficient gas dissolution. With disks as thick as those disclosed in that prior art patent, a high flow rate of sheared fine bubbles cannot be dispersed into the body of liquid without having the fine bubbles coalesce into very much larger bubbles, which will then rise and break the surface of the liquid while still containing too much of the supplied gas undissolved in the liquid. Even a ratio of disk diameter to maximum disk thickness in the gas diffusing area as high as 27:1 has been found to give unsatisfactory results in terms of gas dissolution rate.

However, it has been found that a ratio of disk diameter to maximum disk thickness in the gas diffusing area of about 32:1 provides surprisingly good results, which are satisfactory for many bubble shearing applications. Improved results are obtained when the ratio of disk diameter to maximum disk thickness in the gas diffusing area is at least about 48:1, more improvement is obtained with a ratio of at least about 64:1, and still further improvement is obtained when the ratio is at least about 128:1. The preferred ratio of disk diameter to maximum disk thickness in the gas diffusing area for production of the finest gas bubbles with a very high gas dissolution rate is about 256:1 or even higher.

THEORY OF THE INVENTION

The reason the relationship between disk diameter and disk thickness in the gas diffusing area has such importance appears to be the fact that for some reason the extent of coalescence that is caused by the shedding of large vortices at the edge of a rotating disk is many times greater than the coalescence that would usually be expected from more typical turbulence present under other conditions. The rapidly rotating vortices cause entrainment of the bubbles carried in the wake following the vortices, and then the turbulent collision of closely spaced bubbles in the vortex centers causes coalescence, but at a very much greater rate than would be expected.

With the usual turbulence present under other conditions, perhaps half a dozen to a dozen fine bubbles may be caused to coalesce at one time, but the volume of the resulting larger bubble is not so great as to defeat the aim of achieving a rapid rate of gas dissolution. However, the coalescence of fine bubbles that occurs with high gas flow rates in the vortices produced at the edge of a rotating disk can take place at such a level as to defeat completely the goal of maintaining a large number of very fine bubbles that will produce a high dissolution rate. Thus, tests have shown that typically thousands of sheared bubbles (a number having an order of magnitude three times the order of magnitude of the number of bubbles that tend to coalesce in the usual situation) will with high gas flow rates coalesce into single bubbles within the vortices in the wake/jet emanating from the disk, and this of course has a very marked effect on the volume of the resulting coalesced bubbles.

It appears that the critical relationship between a very thin disk and the efficient formation and maintenance of fine gas bubbles expressed above is due to a number of things:

1. As indicated by FIG. 4 at page 259 of Paul Cooper, "Turbulent Boundary Layer on a Rotating Disk Calculated with an Effective Viscosity," AIAA Journal, Vol. 9 (1971), pages 255–261, the thickness of the boundary layers formed at the upper and lower surfaces of a rotating disk may be represented with a reasonable degree of accuracy by the formula:

$$\delta = 0.26\, DR_e^{-0.125}$$

where $\delta$ = the boundary layer thickness, $D$ = the overall diameter of the disk, and $R_e$ = the Reynolds number of the particular apparatus and liquid involved.

2. The Reynolds number can be represented by the following formula:

$$R_e = \omega D^2 / 4\nu$$

where $\omega$ = the rotation speed of the disk, $D$ = the overall diameter of the rotating disk, and $\nu$ = the kinematic viscosity of the liquid in which the disk is rotating.

3. Substituting this expression for the Reynolds number in the formula given in paragraph 1 above gives the following formula:

$$\delta = \frac{0.26\, D}{\left(\frac{\omega D^2}{4\nu}\right)^{0.125}}$$

4. The disk diameters and rotation speeds of current practical interest in the sewage treatment field span the range from about a 20 inch diameter disk rotating at 400 r.p.m. to about a 10 foot diameter disk rotating at 50 r.p.m. The Reynolds number factor $(\omega D^2/4\nu)^{0.125}$ in the denominator of the formula for determination of boundary layer thickness given in paragraph 3 above varies from about 6.4 for the 20 inch disk to about 7.7 for the 10 foot disk at the respective rotation speeds just indicated.

5. Because the Reynolds number raised to the 0.125 power remains essentially constant (varying only from about 6.4 to about 7.7 in the indicated examples) despite changes in the overall diameter and speed of rotation of the rotating disk, the thickness of the boundary layer flow across a rotating disk immersed in a given liquid and rotated at about the indicated optimum speeds can be represented roughly as some constant times the disk diameter:

$$\delta = K \cdot D$$

6. It is believed that (a) the amount of bubble coalescence occurring within the vortices at the edge of a rotating, disk gas diffuser is proportional to the rate at which bubbles are ingested into, or in other words are transported to the center of, these vortices, (b) this rate in turn is generally proportional to the pressure differential between the inside and outside of individual vortices, and (c) the ratio of disk thickness in the gas diffusing area to boundary layer thickness (d/δ) controls the indicated pressure differential. Thus, the smallest possible value for the ratio of disk thickness in the gas diffusing area to boundary layer thickness (d/δ) should be sought.

7. From the relationship expressed in paragraph 5 above, it would seem to follow that the smallest possible value for the ratio of maximum disk thickness in the gas diffusing area to overall disk diameter (d/D) should also be sought. Conversely, the largest possible ratio of disk diameter to maximum disk thickness in the gas diffusing area (D/d) would appear to be preferred, and this is confirmed by the discovery already expressed above that a ratio of disk diameter to maximum disk thickness in the gas diffusing area of approximately 32:1 produces quite satisfactory bubble shearing results with a rotating gas diffuser, and a higher ratio up to approximately 256:1 or even higher produces the best results.

BRIEF DESCRIPTION OF DRAWINGS

The invention will now be described by reference to the drawings of this application, in which.

DESCRIPTION OF SPECIFIC EMBODIMENT OF INVENTION

A specific embodiment of the rotating gas diffuser of this invention, which is similar to the apparatus shown and described in commonly assigned co-pending application of David C. Ihrig, Jack L. Cooley and Michael W. Boex, on which U.S. Pat. No. 3,992,491 has been issued, will now be described. The apparatus disclosed herein has the same designator numerals in the drawing of this application as are employed in the description of the similar apparatus shown in that co-pending application.

The construction of the rotating gas diffuser shown in FIGS. 1 and 2 of this application will be described in enough detail to enable one skilled in the art to practice the present invention. For a more detailed description of the apparatus, reference should be made to the above mentioned copending patent application of Ihrig et al.

General construction of gas diffuser. FIG. 1 is a side elevation view of one embodiment of the bubble shearing rotating gas diffuser of this invention. Rotating gas diffuser 20 includes disk like member 22 rigidly attached by a plurality of bolts 24 to central ring 25 which is welded to hollow shaft 26. Shaft 26, rotatable around axis 27—27, is driven through gear reducer 28 by electric motor 30, both of which are mounted above the normal level of the body of liquid in which rotating gas diffuser 20 is immersed. Electric motor 30 is preferably a variable speed motor.

Rotatable shaft 26 is shown broken away to indicate that disk like member 22 is normally located some 12 to 14 feet below the surface of the body of mixed liquor— contained for example in the aeration tank of a conventional activated sludge sewage treatment plant—into which fine gas bubbles are to be introduced by rotation of disk like member 22.

Sleeve 32 is adapted to be secured by means of attaching clamps 37 and associated bolts 38 to shaft 26 at a predetermined depth in the zone lying between two stops, lower stop 34 and upper stop 36, which are carried by the shaft. Sleeve 32 carries helical float submerging screw 40, so that when shaft 26 is rotated screw 40 tends to cause any "float" present—in the form of intermixed air bubbles and suspended solid particles on top of the liquid contents of the tank with which rotating gas diffuser 20 is employed—to be submerged beneath the surface of the liquid.

Circulation of the liquid contents directly above rotatable disk like member 22 is effected by means of impeller vanes 42 carried on the top of member 22. A similar movement of the liquid contents of the tank lying directly beneath rotatable disk member 22 is accomplished by impeller vanes 44 carried on the bottom of member 22. In this manner impeller vanes 42 and 44, both of conventional construction, help maintain in suspension in the liquid contents of the tank any solid particles suspended in the liquid.

As indicated above, rotatable shaft 26 is hollow. The hollow shaft defines main feed line 48, into which gas that is to be introduced into the body of liquid being treated is fed, through rotatable connection 49, from a source of compressed gas (not shown).

The basic supporting structure for rotatable disk like member 22 includes hub plate 50 with bolt holes 52 to receive the bolts by which the hub plate is affixed to central ring 25 carried by rotatable shaft 26. Bolt plate 50 has outwardly extending shoulder 54 (FIG. 2).

One embodiment of the apparatus of this invention may include a plurality of main rigid structural spokes extending radially outwardly from hub plate 50. An equal number of rigid hollow gas feed conduits may likewise be attached to hub plate 50 in positions extending radially outward therefrom between each pair of adjacent main structural spokes. The radially extending structural spokes and feed conduits are not shown here, being covered in FIG. 2 by skin means 60 and skin portions 60a lying between adjacent porous plates. Circular hoop 66 is secured to the outer end of the structural spokes and gas feed conduits to impart rigidity to this arrangement of radially extending basic structural members.

Figure 2:
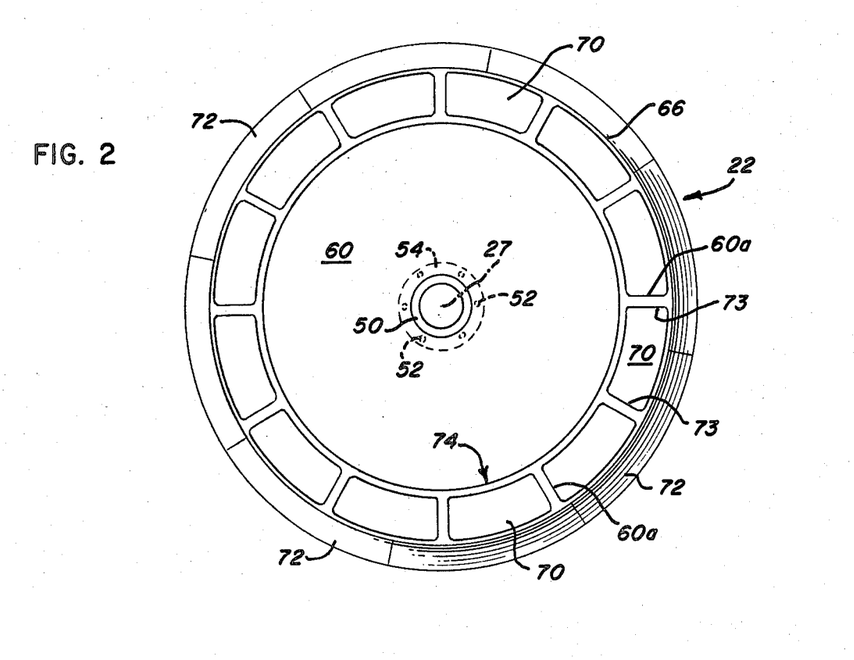
FIG. 2 is a top plan view of the rotatable disk like member of the embodiment of FIG. 1, with the impeller vanes on the top of the disk like member omitted for clarity.

In the embodiment shown, tapered perimeter portions 72 form an annular section of rotating disk like member 22 outward of circular hoop 66 (FIG. 2).

Porous walled gas plenums. FIG. 2 is a top plan view of the complete disk like member 22, with porous plates 70 and tapered annular perimeter portion 72 in place, but with impeller vanes 42 omitted and the attachment of plates 70 to rotatable disk like member 22 shown only diagrammatically.

Each porous plate 70 has the shape of a section of an annulus with its lateral edges 73 aligned radially with the rotating gas diffuser. The material of which the porous plates are formed may be any porous medium with openings smaller than about 50 microns. Porous plates 70 may be formed, for example, of porous ceramic material, a porous sintered metal, a porous sintered plastic material, micropore stainless steel screen, or the like.

A plurality of such porous plates is carried by the previously described arrangement of main structural spokes and radially extending hollow gas feed conduits on at least one of the top and bottom of disk like member 22. One plate is positioned on the top or bottom of member 22, and in the embodiment disclosed on both the top and bottom of member 22, between each radial gas feed conduit and the immediately adjacent main structural spoke lying on each side thereof.

In FIG. 2, porous plate holder 74 supports a pair of porous plates 70, one on the top and one on the bottom (not seen) of rotatable disk member 22. In addition, each plate holder 74 defines, with the upper and lower porous plates 70 supported by it, a gas plenum underlying each porous plate.

Each gas plenum is fed compressed gas which is first introduced through main feed line 48 and then carried radially outward through the radially extending hollow feed conduits.

Ratio of disk diameter to disk thickness in gas diffusing area. Rotatable disk like member 22 of the embodiment of the rotating gas diffuser of this invention illustrated in FIG. 1 has an outside diameter of about 7 feet. As shown, this is approximately 64 times the maximum thickness of the disk like member in its bubble shearing area where the porous surfaces through which gas is diffused are located. The perimeter of member 22 is tapered at 46 to a thickness of about 1/16 inch.

As already pointed out above, it has been found that a ratio of disk diameter to maximum disk thickness in the gas diffusing area occupied by porous plates 70 of about 32:1 provides good results which are satisfactory for many bubble shearing applications. Improved results are obtained when the ratio of disk diameter to maximum disk thickness in the gas diffusing area of the disk like member is at least about 48:1, more improvement is obtained with a ratio of at least about 64:1 (as illustrated in FIG. 1), and still further improvement is obtained when the ratio is at least about 128:1.

The preferred ratio of disk diameter to maximum disk thickness in the gas diffusing area for production of the finest gas bubbles with a very high gas dissolution rate is about 256:1 or even higher.

With the rotating gas diffuser of this invention as described, a very efficient production of fine gas bubbles for diffusion through a body of liquid in which the rotating diffuser is immersed is readily achieved. The introduction of compressed gas in the main feed line 48 when disk like member 22 is rotating about axis 27—27 while immersed in the body of liquid will cause gas to flow into the gas plenums and out through porous plates 70. This produces nascent gas bubbles on the surface of the porous plates, which are sheared off by the viscous shear forces exerted by the liquid as disk like member 22 rotates in the body of liquid.

EXAMPLES

Several examples relating to the use of the rotating gas diffuser of this invention will now be described.

EXAMPLE 1

Figure 1:
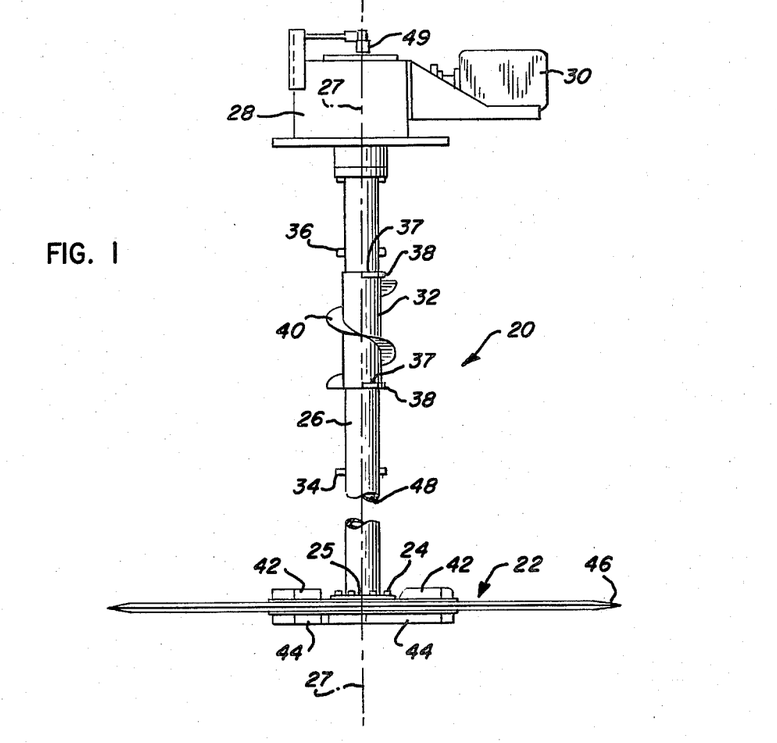
FIG. 1 is a side elevation of one embodiment of the rotating gas diffuser of this invention, with a portion of the rotatable shaft omitted to conserve space.

Air was introduced under a pressure of approximately 10 psig into main gas feed line 48 of a rotating gas diffuser of the general type shown in FIGS. 1 and 2 of this application. The gas flow density maintained during the test was varied over a range from about 0.2 to about 0.9 cmf/ft.² of diffusing surface area. The liquid in which the rotating gas diffuser was immersed and rotated was tap water.

The diameter of rotatable disk like member 22 of the gas diffuser used in this example was about 13.5 inches, and its maximum thickness in the area occupied by porous plates 70 was about ½ inch. The ratio of D/d was thus about 27.

The disk like member was rotated at about 490 r.p.m., producing a tangential shear velocity "v" of about 22.7 ft./sec.

Porous plates 70 were formed of ceramic tile having a maximum pore size of about 6 microns. The plates were located on the top only of rotating disk like member 22. The individual plates were about ⅛ inch thick and about ½ inch wide in the radial direction.

Figure 3:
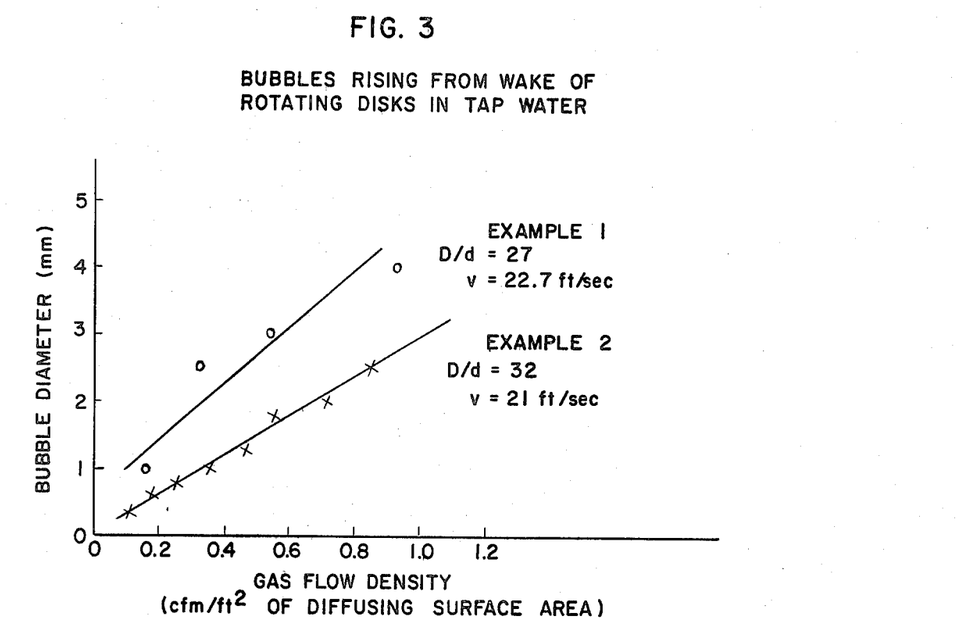
FIG. 3 is a graph showing the size of bubbles, at various gas flow densities, that are seen rising in tap water from the wake of rotating gas diffusers with the indicated ratios of disk diameter to maximum disk thickness in the gas diffusing area.

During the operation of the rotating gas diffuser described, the maximum diameter for the bubbles rising from the wake of rotating disk like member 22 was observed for the various gas flow densities employed, and the observed data were plotted in FIG. 3. In estimating maximum observed bubble size, occasional bubbles of a diameter two or more times larger than all the other bubbles were excluded, because they represented an extremely small percentage of the total volume of the gas.

It was observed that with the apparatus described in this example there was a large number of bubbles that rose to the surface of the liquid and broke the surface. The D/d ratio of about 27, which produced bubbles of about 4 mm. maximum diameter at the tangential shear velocities and gas flow densities indicated in the graph of FIG. 3—which are typical operating conditions of interest in the treatment of waste water of various kinds—thus gave results in terms of gas dissolution rate that were by standards accepted in the sewage treatment industry unsatisfactory for the treatment of waste water such as municipal sewage.

EXAMPLE 2

The experiment of Example 1 was repeated with a rotatable disk like member having a diameter of about 20 inches and a maximum thickness in the area occupied by porous plates 70 of about ⅝ inch. This gave a D/d ratio of about 32. Disk like member 22 was rotated at about 400 r.p.m., and the tangential shear velocity was thus about 21 ft./sec.

The individual porous plates 70 on rotatable disk like member 22 were about ¼ inch thick and about 1⅛ inch in radial width. The pressure at which air was introduced into main gas feed line 48 was approximately 15 psig.

The maximum bubble sizes observed for various gas flow densities with the apparatus of this example were plotted in FIG. 3. As there seen, the results in terms of bubble size showed a marked difference from the results of Example 1, with the bubble sizes observed not only being smaller but increasing more slowly in size with increased gas flow densities (note the comparative slopes of the two curves of FIG. 3) than with the apparatus of Example 1. The bubble size obtained in this example would be satisfactory for many bubble shearing applications.

EXAMPLE 3

Figure 4:
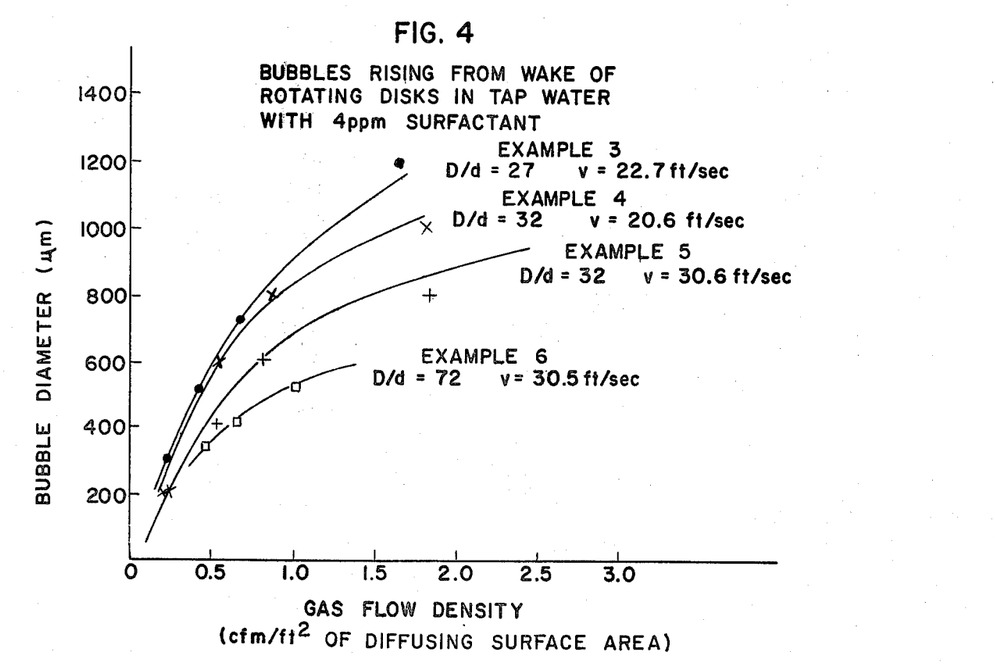
FIG. 4 is a similar graph showing the size of bubbles rising in tap water with a small amount of surfactant added.

The experiment of Example 1 was repeated except that the liquid in which the disk like member was immersed and rotated was tap water with 4 ppm of a surfactant, and the gas flow densities were as shown in the graph of FIG. 4, varying from about 0.25 to about 1.7 cfm/ft.² of diffusing surface area.

(The addition of the surfactant rendered the liquid very similar, with regard to bubble formation, to typical mixed liquor in an activated sludge sewage treatment plant. The surfactant renders coalescence more difficult, a typical condition in such waste liquid.)

The results in this example with a D/d ratio of about 27 are as plotted at the top of FIG. 4. Here the bubble sizes are greatly improved over the results obtained in Example 1, because of the presence of the surfactant.

EXAMPLE 4

The experiment of Example 3 was repeated with the following changes:

| | |
|---|---|
| Disk diameter | 20" |
| Maximum disk thickness in gas diffusing area | ⅝" |
| D/d | 32 |
| Revolutions per minute | 440 |
| Tangential shear velocity "v" | 20.6 ft./sec. |
| Porous plate thickness | ¼" |
| Porous plate radial width | 1-⅛" |
| Air pressure | 15 psig |
| Gas flow density | Approx. 0.25–1.9 cfm/ft.² diffusing surface area |

The maximum bubble sizes observed for various gas flow densities with the apparatus of this example were plotted as the second curve of FIG. 4. As there seen, the results in terms of bubble size showed a marked difference from the results of Example 3 plotted as the first curve of the graph. The bubble sizes obtained were not only smaller. In addition, above a gas flow density of about 1.0 cfm/ft.² of diffusing surface area, the bubbles increased more slowly in size (see the comparative slopes of the right-hand portions of the first two curves of FIG. 3) than with the apparatus of Example 3.

The bubble sizes obtained in this example would be satisfactory for many bubble shearing applications.

EXAMPLE 5

The experiment of Examples 3 and 4 were carried out with tangential shear velocities that were very nearly the same magnitude. In the present example, the experiment of Example 4 (involving a D/d ratio of 32) was repeated with porous plates 70 having a radial width of about 1 inch and with disk like member 22 being rotated at about 610 r.p.m. to produce a tangential shear velocity "v" of about 30.6 ft./sec.

As will be seen from the graph of FIG. 4, the bubble sizes produced in this example were improved over those of both Examples 3 and 4.

EXAMPLE 6

For this example, the experiment of Example 3 was repeated with the following changes:

| | |
|---|---|
| Disk diameter | 72" |
| Maximum disk thickness in gas diffusing area | 1" |

| -continued | |
|---|---|
| D/d | 72 |
| Revolutions per minute | 125 |
| Tangential shear velocity | 30.5 ft./sec. |
| Porous plate thickness | ⅜" |
| Porous plate radial width | 4" |
| Location of porous plates | Top and bottom of portable disk 22 |
| Air pressure | 20 psig |
| Gas flow density | Approx. 0.5–1.2 cfm/ft.² diffusing surface area |

The bubble sizes produced in this Example 6 were further improved over the results in Example 5.

As stated above, still further improvement in bubble size is obtained if the D/d ratio is increased to at least about 128:1. The preferred ratio of disk diameter to maximum disk thickness in the gas diffusing area is about 256:1 or even higher.

It will be noted that the curves representing the results of Examples 4, 5 and 6 have generally the same slope for the plotted data when the gas flow density maintained was above about 1.0 cfm/ft.² of diffusing surface area, and that all the slopes referred to are markedly different from the slope of the curve representing the results of Example 1. It may be assumed that similar curves drawn for D/d ratios greater than 72 would have much the same general characteristics, with even smaller bubbles observed, as the three bottom curves of the family of curves in FIG. 4.

Control of the gas flow densities—i.e., the gas flow through a unit area of the porous gas diffusing surface—in the above examples means that these tests compared essentially the same size bubbles at the bubble shearing surface, and roughly the same area spacing between the bubbles in the boundary layer flow leaving the rotating disk surfaces. Thus, the observed variations in the size of the bubbles rising from the wake/jet flow surrounding the various disks are due to differences in the coalescence mechanisms occurring in that wake and jet, which it has been discovered (as pointed out above) are caused by differences in the ratio of disk diameter to maximum disk thickness in the gas diffusing area.

The above detailed description has been given for clearness of understanding only. No unnecessary limitations should be understood therefrom, as modifications will be obvious to those skilled in the art.

Examination of the graphs of FIGS. 3 and 4 will show immediately what a surprisingly great improvement in bubble shearing performance is produced by utilizing a rotating disk gas diffuser having a D/d ratio as called for in the appended claims. This in turn will demonstrate what a surprisingly large savings is made possible through use of the D/d ratio of this invention, for a lower requirement in gas diffusion equipment obviously means lower capital and maintenance costs for the operator of the sewage treatment or other waste water treatment plant.

FIG. 3 of the drawing shows that an increase in D/d ratio from 27:1 to 32:1 (even while slightly decreasing the shear velocity) greatly increases the amount of gas that can be flowed through a disk rotating in tap water to produce bubbles of a given size. Thus, bubbles of 3 mm. diameter can be produced with a gas flow density about 1.8 times as great in Example 2 as in Example 1, while bubbles of 2 mm. diameter and 1 mm. diameter can be produced with a gas flow density about 2.1 times as great and 3.2 times as great, respectively, in Example 2 as in Example 1. These relationships are derived from the following values that are taken from the graph in FIG. 3:

TABLE I

| Example | D/d Ratio | Bubble Diameter | Gas Flow Density |
|---|---|---|---|
| 1 | 27 | 3 mm. | 0.56 cfm/ft² |
| 2 | 32 | " | 1.01 cfm/ft² |
| 1 | 27 | 2 mm. | 0.33 cfm/ft² |
| 2 | 32 | " | 0.68 cfm/ft² |
| 1 | 27 | 1 mm. | 0.10 cfm/ft² |
| 2 | 32 | " | 0.32 cfmft² |

The last column on the right in Table 1 just above shows that the gas flow density in Example 2 is much larger than the gas flow density in Example 1:

TABLE 2

| Bubble Diameter | Ratio Of Gas Flow Densities |
|---|---|
| 3 mm. | 1.01/0.56 = 1.8 |
| 2 | 0.68/0.33 = 2.1 |
| 1 | 0.32/0.10 = 3.2 |

As is well known to those skilled in the art, a higher gas flow density for bubbles of a given size is greatly preferred, since a larger quantity of gas can thus be made available for dissolution into the body of liquid being treated. And it is indeed surprising, as applicant has discovered, that increases in gas flow density of two to three times can be achieved simply by increasing the D/d ratio of the rotating disk gas diffuser from about 27:1 (Example 1) to about 32:1 (Example 2). In other words, an increase of about 19 percent in D/d ratio increased the gas flow density by about 100 to about 200 percent.

FIG. 4 of the drawing shows that an increase in D/d ratio from 27:1 to 32:1 (even while slightly decreasing the shear velocity) greatly increases the amount of gas that can be flowed through a disk rotating in simulated sewage (tap water with 4 ppm surfactant) to produce bubbles of a given size. Thus, bubbles of 1000 microns diameters can be produced with a gas flow density about 1.3 times as great in Example 4 as in Example 3. FIG. 4 also shows that an increase of D/d from 32:1 to 72:1 (while keeping the shear velocity substantially the same) increases the amount of gas flow density in the simulated sewage even more markedly. Thus, bubbles of 500 microns diameter can be produced with a gas flow density about 1.5 times as great in Example 6 as in Example 5. These relationships are derived from the following values that are taken from the graph of FIG. 4:

TABLE 3

| Example | D/d Ratio | Bubble Diameter | Gas Flow Density |
|---|---|---|---|
| 3 | 27 | 1000 microns | 1.22 cfm/ft² |
| 4 | 32 | " | 1.60 cfm/ft² |
| 5 | 30.6 | 500 microns | 0.58 cfm/ft² |
| 6 | 30.5 | " | 0.86 cfm/ft² |

The last column on the right in Table 3 just above shows that the ratio of gas flow density in Example 4 compared to Example 3, and the ratio of gas flow density in Example 6 compared to Example 5, are as follows:

TABLE 4

| Examples | Bubble Diameter | Ratio Of Gas Flow Densities |
|---|---|---|
| 4 and 3 | 1000 microns | 1.60/1.22 = 1.3 |

TABLE 4-continued

| Examples | Bubble Diameter | Ratio Of Gas Flow Densities |
|---|---|---|
| 6 and 5 | 500 | 0.86/0.58 = 1.5 |

From the above discussion of the graphs of FIGS. 3 and 4, it is seen that the increase from a D/d ratio of about 27:1 to a D/d ratio of about 32:1 produces very greatly increased gas flow densities—ranging from 1.3 times to 3.2 times larger depending on the size of the bubbles produced. (See results tabulated in Tables 4 and 2, respectively.) Thus, the increase in the D/d ratio from about 27:1 to about 32:1, surprisingly, produced increases of gas flow density of 80, 110, and 220 percent for Example 2 compared to Example 1 (see Table 2) 30 percent for Example 4 compared to Example 3 (see Table 4) and 50 percent for Example 6 compared to Example 5 (see Table 4).

The practical significance of the comparisons made in Tables 2 and 4 above of the results of Examples 1–4 is enormous. In order to produce the same gas flow density, with a D/d ratio of about 27:1 in Example 1, 1.8 times as much gas diffusion equipment (with its proportionately higher capital and maintenance costs) will be required as with the D/d ratio of about 32:1 in Example 2 for bubbles of 3 mm. diameter, and 2.1 and 3.2 times as much diffusion equipment for bubbles of 2 and 1 mm. diameter, respectively. In the same way, 1.3 times as much gas diffusion equipment is required with the D/d ratio of about 27:1 in Example 3 as with the D/d ratio of about 32:1 in Example 4 for bubbles of 1000 microns, and 1.5 times as much equipment with the D/d ratio of about 32:1 in Example 5 as with the D/d ratio of about 72:1 in Example 6 for bubbles of 500 microns.

The great savings in both capital and maintenance costs just indicated are accomplished by use of an ultra-thin disk as defined in the appended claims, a structure that never occurred, so far as the prior art shows, to anyone skilled in the art before applicant departed from the accepted practice in this field to make the present invention.

The above detailed description has been given for clearness of understanding only. No unnecessary limitations should be understood therefrom, as modifications will be obvious to those skilled in the art.

What is claimed is:

1. A rotating gas diffuser for shearing fine gas bubbles from the surface thereof when the diffuser is immersed in a body of liquid and rotated therein, which comprises:

a hollow rotatable shaft, said shaft defining a main feed line for the gas to be introduced into said body of liquid, a disk like member mounted on said shaft perpendicular to the axis of rotation thereof, said member defining at least one gas plenum in operative connection with said main feed line, at least one wall of said plenum being porous to permit the passage of gas through said wall to the outer surface of said disk like member so that the introduction of gas into said main feed line when the gas diffuser is rotating about its axis of rotation while immersed in said body of liquid will cause gas to flow into said gas plenum and out through said porous wall thereof to produce nascent gas bubbles on the surface of said disk like member, which nascent bubbles are sheared off to form fine gas bubbles by the viscous shear forces exerted by said liquid as the disk member rotates in said body of liquid, and means for minimizing the coalescence of said fine sheared bubbles, resulting from turbulence in the wake and jet surrounding the rotary disk like member that is caused by vortices shed from the edge of the disk like member and spiraling outward from said edge, said means including said disk like member, wherein the ratio of the overall diameter of said disk like member to the maximum thickness thereof in the gas diffusing area occupied by said gas plenums is at least about 32:1.

2. The rotating gas diffuser of claim 1 in which the ratio of the overall diameter of said disk like member to the maximum thickness thereof in the gas diffusing area occupied by said gas plenums is at least about 48:1.

3. The rotating gas diffuser of claim 1 in which the ratio of the overall diameter of said disk like member to the maximum thickness thereto in the gas diffusing area occupied by said gas plenums is at least about 64:1.

4. The rotating gas diffuser of claim 1 in which the ratio of the overall diameter of said disk like member to the maximum thickness thereof in the gas diffusing area occupied by said gas plenums is at least about 128:1.

5. The rotating gas diffuser of claim 1 in which the ratio of the overall diameter of said disk like member to the maximum thickness thereof in the gas diffusing area occupied by said gas plenums is at least about 256:1.

6. The rotating gas diffuser of claim 1 in which both the top wall and the bottom wall of said gas plenum are porous and permit the passage of gas therethrough.

7. The rotating gas diffuser of claim 1 in which the top surface and bottom surface of said disk like member are substantially parallel to each other throughout their area.

8. The rotating gas diffuser of claim 1 in which the top surface and bottom surface of said disk like member are substantially parallel to each other except in the outer edge portion of said disk, where the disk tapers in cross section to a smaller thickness at the perimeter of said member.

9. The rotating member of a rotating gas diffuser for submersion into a body of liquid, which comprises:

a rotatable disk like member having a gas inlet and defining at least one gas plenum in operative connection with said inlet and at least one wall of said plenum being porous to permit the passage of gas through said wall to the outer surface of said disk like member so that the introduction of gas into said gas inlet when the gas diffuser is rotating about its axis of rotation while immersed in said body of liquid will cause gas to flow into said gas plenum and out through said porous wall thereof to produce nascent gas bubbles on the surface of said disk like member, which nascent bubbles are sheared off to form fine gas bubbles by the viscous shear forces exerted by said liquid as the disk member rotates in said body of liquid, and means for minimizing the coalescence of said fine sheared bubbles, resulting from turbulence in the wake and jet surrounding the rotary disk like member that is caused by vortices shed from the edge of the disk like member and spiraling outward from said edge, said means including said disk like member, wherein the ratio of the overall diameter of said disk like member to the maximum thickness thereof in the gas diffusing area occupied by said gas plenums is at least about 32:1.

10. The rotatable disk like member of claim 9 in which the ratio of the overall diameter of said disk like member to the maximum thickness thereof in the gas diffusing area occupied by said gas plenums is at least about 48:1.

11. The rotatable disk like member of claim 9 in which the ratio of the overall diameter of said disk like member to the maximum thickness thereof in the gas diffusing area occupied by said gas plenums is at least about 64:1.

12. The rotatable disk like member of claim 9 in which the ratio of the overall diameter of said disk like member to the maximum thickness thereof in the gas diffusing area occupied by said gas plenums is at least about 128:1.

13. The rotatable disk like member of claim 9 in which the ratio of the overall diameter of said disk like member to the maximum thickness thereof in the gas diffusing area occupied by said gas plenums is at least about 256:1.

14. The rotatable disk like member of claim 9 in which both the top wall and the bottom wall of said gas plenum are porous and permit the passage of gas therethrough.

15. The rotatable disk like member of claim 9 in which the top surface and bottom surface of said disk like member are substantially parallel to each other throughout their area.

16. The rotatable disk like member of claim 9 in which the top surface and bottom surface of said disk like member are substantially parallel to each other except in the outer edge portion of said disk, where the disk tapers in cross section to substantially zero thickness at the perimeter thereof.

* * * * *